United States Patent
Vignola et al.

(10) Patent No.: US 7,658,853 B2
(45) Date of Patent: Feb. 9, 2010

(54) PROCESS FOR THE TREATMENT OF CONTAMINATED WATER BY MEANS OF A BIFUNCTIONAL SYSTEM CONSISTING OF IRON AND ZEOLITES

(75) Inventors: Rodolfo Vignola, Monterotondo-Roma (IT); Raffaello Sisto, Rome (IT); Giovanni Grillo, Rome (IT); Umberto Cova, Rome (IT); Pietro Cesti, Trecate-Novara (IT)

(73) Assignee: ENI S.p.A., Roma (IT)

( * ) Notice: Subject to any disclaimer, the term of this patent is extended or adjusted under 35 U.S.C. 154(b) by 0 days.

(21) Appl. No.: 12/093,096

(22) PCT Filed: Nov. 10, 2006

(86) PCT No.: PCT/EP2006/010880
§ 371 (c)(1),
(2), (4) Date: Aug. 27, 2008

(87) PCT Pub. No.: WO2007/054358

PCT Pub. Date: May 18, 2007

(65) Prior Publication Data
US 2009/0014390 A1    Jan. 15, 2009

(30) Foreign Application Priority Data
Nov. 11, 2005 (IT) .................... MI2005A2150

(51) Int. Cl.
*C02F 3/00* (2006.01)
(52) U.S. Cl. .................. 210/661; 210/668; 210/691; 210/757; 210/763

(58) Field of Classification Search ................. 210/661, 210/668, 691, 757–758, 763
See application file for complete search history.

(56) References Cited

U.S. PATENT DOCUMENTS

| 5,266,213 | A | 11/1993 | Gillham |
| 5,543,059 | A * | 8/1996 | Howson et al. ............. 210/757 |
| 5,733,067 | A | 3/1998 | Hunt et al. |
| 7,341,665 | B2 | 3/2008 | Vignola et al. |
| 2004/0074844 | A1 | 4/2004 | Basset et al. |
| 2004/0206705 | A1* | 10/2004 | Vignola et al. ............. 210/660 |
| 2005/0150836 | A1* | 7/2005 | Williams .................... 210/662 |

FOREIGN PATENT DOCUMENTS

| EP | 0 522 946 | 1/1993 |
| JP | 2000 279985 | 10/2000 |
| WO | 03 002461 | 1/2003 |

OTHER PUBLICATIONS

U.S. Appl. No. 12/336,112, filed Dec. 16, 2008, Vignola et al.

* cited by examiner

*Primary Examiner*—Chester T Barry
(74) *Attorney, Agent, or Firm*—Oblon, Spivak, McClelland, Maier & Neustadt, L.L.P.

(57) ABSTRACT

A process is described for the treatment of water contaminated by metals with a high oxidation degree, aliphatic compounds, aromatic compounds, halogen-aromatic compounds, chlorinated alkane and alkene compounds or mixtures thereof, which consists in circulating the contaminated water through a reactive system consisting of metallic iron and a zeolite having a silica/alumina ratio >50, placed in succession, wherein the first element through which the water passes is iron.

20 Claims, 5 Drawing Sheets

Comparison of system

Two types of zeolites (ZSM - 5/Y Zeolite) and zero-valent Iron/ZSM-5
Laboratory simulation apparatus

PROCESS FOR THE TREATMENT OF CONTAMINATED WATER BY MEANS OF A BIFUNCTIONAL SYSTEM CONSISTING OF IRON AND ZEOLITES The present invention relates to a process for the treatment of contaminated water which is based on the use of a bifunctional reactive system consisting of iron and zeolites.

More specifically, it relates to a process for the treatment of water contaminated by metals with a high oxidation degree, halogenated solvents and compounds deriving from the oil industry, which consists in circulating the contaminated water through a bifunctional system consisting of metallic iron and a zeolite, placed in succession.

The process according to the invention can be conveniently used for the treatment of contaminated underground water by the use of a permeable reactive barrier (PRB) in which the reactive material consists of the bifunctional system of the invention.

The in situ use of permeable barriers, placed perpendicularly to the direction of the underground water flow, capable of removing contaminants, consists of an emerging technique for the treatment of underground water.

The most significant advantages of this technique are the strong reduction in energy and labour costs. Not less important, however, is the possibility of using the site, during the treatment, for other purposes thanks to the lack of surface overstructures.

Among the various mechanisms at the basis of the functioning of the barriers, the most effective are based on the use of adsorbing materials or on systems capable of promoting degradation by a chemical or biological approach.

Conventional permeable reactive barriers (PRB) for the decontamination of water contaminated by halogenated solvents and/or metals with a high oxidation number, are based on systems which use metallic iron and/or granular activated carbon (GAC).

The first system, by exploiting the reducing capacity of iron, is only active towards reducible substances, such as organo-chlorinated products or metals with a high oxidation number (U.S. Pat. No. 5,266,213), WO 92/19556).

The second is an aspecific absorbent and as such has a low selectivity with respect to interfering substances present in water and in particular underground water (ions, humic acids, etc. Williamson, D. 2000. Construction of a funnel-and-gate treatment system for pesticide-contaminated groundwater. Chemical Oxidation and reactive barriers. Godage B. et al. Eds In II Intl. Conf. On Remediation of chlorinated and recalcitrant compounds. Monterey, Calif., USA, Battelle Press, Columbus, (2000)), pages 257-264. Schad, H. 2000. Funnel-and-gate at a former manufactured gas plant site in Kalsruhe, Germany: design and construction. In: Chemical Oxidation and reactive barriers. Godage B. et al. Eds., II Intl. Conf. on Remediation of chlorinated and recalcitrant compounds. Monterey, Calif., USA, Battekke Press, Columbus, (2000), 215-322).

These systems, however, proved to be ineffective in removing all the main pollutants, often contemporaneously present in contaminated water-bearing stratums underlying industrial sites, which frequently consist of apolar compounds such as halogenated solvents and compounds deriving from the oil industry.

Attempts directed towards improving the efficacy of barriers based on metallic iron alone have led to the formation of systems in which the metallic iron is associated with coal (Dahmke, A., Schafer, D. and R. Kober. 1999. Development of coupled in situ reactors and optimization of the geochemical processes downstream of different in situ reactor system. In SAFIRA. Abstracts of the workshop of Nov. 17-18, 1999 at Bitterfeld/Germany, pages 74-78) and microorganisms (Alvarez, P. et al. 1998. WO 98/49106; PCT/US 98/08196).

The iron/coal association however, just leads to an addition of the advantages and disadvantages of the two systems leaving the limits unaltered.

The treatment effected with iron-based systems, for example, requires that this element be always present in a certain thickness, as coal is not capable of removing compounds such as vinyl chloride, 1,2-DCA and chloro-aromatic compounds which require long degradation times.

In order to overcome the critical aspects specified above, permeable barriers have been proposed in the art, which are substantially based on the use of apolar zeolites as adsorbents of specific substances.

Zeolites have a higher absorbing capacity and functioning duration with respect to that of the materials currently used in permeable reactive barriers, such as activated carbon.

Patent application WO 03/0022461 describes permeable barriers based on the use of apolar zeolites which allow the effective and selective removal of contaminants which are difficult to eliminate, normally present in contaminated water-bearing stratums close to industrial sites.

Italian patent application MI03A002549 describes a process for the treatment of contaminated water by means of permeable barriers which are based on the use of at least two types of apolar zeolites placed in succession, and allows the effective removal of organic contaminants from water when these are present at both low and high concentrations.

Although the processes of the known art allow an effective and selective elimination of some categories of contaminants, they make no mention, however, of the possibility of effectively treating water in which metals with a high oxidation degree, halogenated solvents and compounds deriving from the oil industry, are contemporaneously present.

An improved process has now been found for the treatment of water contaminated by the above compounds, which is based on the use of a reactive system consisting of metallic iron and zeolites.

An object of the present invention therefore relates to a process for the treatment of water contaminated by metals with a high oxidation degree, aliphatic compounds, aromatic compounds, halogen-aromatic compounds, chlorinated alkane and alkene compounds or mixtures thereof, which consists in circulating the contaminated water through a reactive system consisting of metallic iron and a zeolite having a silica/alumina ratio >50, placed in succession, in which the first element through which the water passes is iron.

Figure 1:
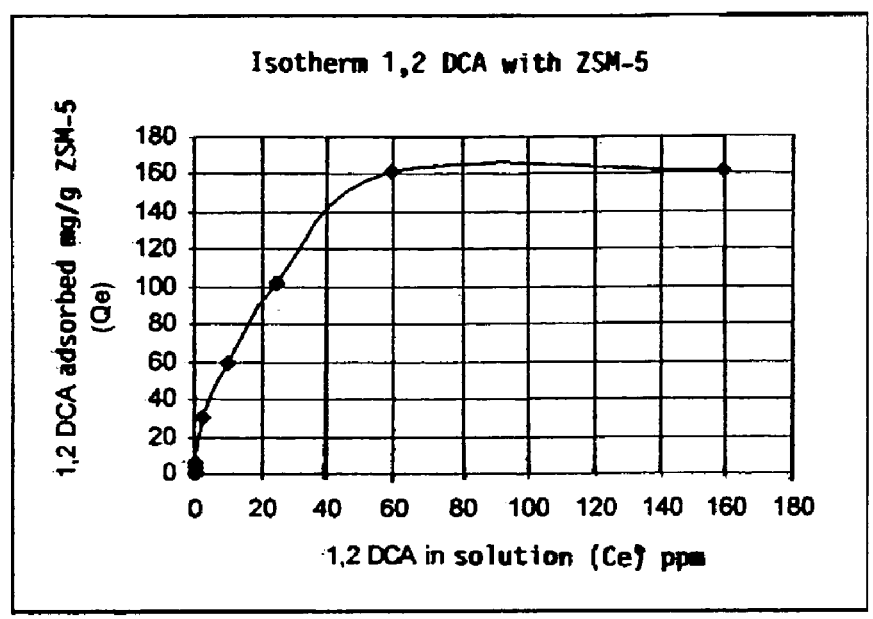
FIG. 1 shows the results obtained in Example 1.

The system of the invention has an improved efficiency with respect to systems consisting of zeolite alone or iron alone, providing an economical treatment of water contaminated by high concentrations of compounds reducible by iron, such as chlorinated alkane and alkene, in the presence of low concentrations of non-reducible compounds such as aliphatic compounds, aromatic compounds and contaminants which are difficult to reduce such as halogen-aromatic compounds, 1,2 dichloro-ethane (1,2 DCA), dichloro-ethylene (DCE), vinyl chloride (VC).

This is due to the fact that iron and zeolite act with two different mechanisms: the first element of the treatment, iron, reduces the reducible contaminants, whereas the second, placed in succession with respect to the first, removes the non-reducible contaminants.

The treatment with iron thus allows the reducible compounds present in high concentrations to be removed, which would otherwise rapidly saturate the zeolite-based adsorbent, whereas the zeolite allows the reduction of the thickness of the treatment system based on Iron, by limiting the chemical reduction only to the most rapidly reducible contaminants and allowing the subsequent adsorption on the zeolite of those more difficult to reduce. When operating with a barrier based on metallic iron alone, the chemical reduction reaction of the reducible compounds such as alkene-chlorinated products, the most common contaminants, passes not only through rapidly reducible intermediates, such as tetrachloro-ethylene and trichloro-ethylene which are degraded in a few hours, but also through slowly reducible compounds, such as dichloro-ethylene and vinyl chloride, which require from 1 to 2 days to be degraded.

In this case, it is only the thickness of the iron which can ensure the time necessary for completing the reactions and which must therefore be present in large quantities to guarantee the complete decontamination of the underground water.

When operating, on the other hand, with a mixed Iron-Zeolite system, the more slowly reducible intermediate compounds are easily adsorbed by the zeolites, allowing a considerable reduction in the thickness of the iron.

The term zeolite should be considered herein in the widest sense of its common use, comprising, for example, both molecular sieves based on metallosilicates and purely silica forms, as better specified hereunder.

The reactive system can be effectively used for the production of permeable reactive barriers for the treatment of water contaminated by metals with a high oxidation degree, aliphatic compounds, aromatic compounds, halogen-aromatic compounds, chlorinated alkane and alkene compounds or mixtures thereof.

In particular, the process of the invention is economically advantageous when the concentration of the reducible contaminants, which can be treated with metallic iron, is extremely high. In this case, the concentration of degradable contaminants is significantly reduced by the action of the iron, thus guaranteeing a greater duration for the zeolite between one regeneration and another.

The process of the invention envisages that iron be the first element of the reactive system through which the water passes and that this has a reducing action with respect to reducible contaminants.

The zeolite, on the other hand, which is placed in succession with respect to the iron, has the task of removing, by adsorption, the non-reducible or slowly reducible contaminants such as dichloro-ethylene and vinyl chloride. In this way, the reductive degradation reaction is only limited to the rapidly reducible contaminants and this makes it possible to use a much lower quantity of iron with respect to that required in systems based on iron alone.

In this system, in fact, the degradation process of the aliphatic chlorinated contaminants tetrachloroethylene (PCE) and trichloroethylene (TCE), passes through dichloro-ethylene (DCE), through vinyl chloride (VC) and therefore through ethylene.

As the degradation of DCE and VC is much slower, it consistently determines the quantity of metal of the treatment system (Arnold, W. A. and Roberts A. L. 2000. Environ Sci. Technol. 34, 1794-1805).

The presence of a subsequent layer of zeolite, as in the case of the present invention, reduces this ratio, as the possible by-products are removed all the same, even in concentrations higher than 1000-2000 times the allowed limit (0.5 ppb for VC).

As the zeolite, moreover, does not have to adsorb the initial high concentrations of contaminants (>50 ppm), the operating time can be lengthened.

In practice, even if a single zeolite-based system could technically treat all the contaminants considered, the economical aspect of the treatment is considerably improved by the bifunctional iron-zeolite system of the invention.

This is due to the fact that in degradations with $Fe^0$, after the creation of the first reaction intermediates in the initial part (passage of PCE to TCE, for example), there is an exponential decrease of the concentrations of the subsequent intermediates (passage of DCE to VC and to ethylene in the same degradation reaction of PCE).

In order to reduce the concentration from 100 to 50 ppm, the same time is required, in fact, as for reducing it from 2 to 1 ppm. The quantity of iron necessary for reaching the desired concentration therefore only increases logarithmically with the initial concentration. This makes the degrading system, based on metallic Fe, more convenient at high concentrations with respect to an adsorption system.

Indicatively, the concentration at which $Fe^0$ becomes convenient with respect to the zeolite (and probably also with respect to pump & treat) is in the order of tens of ppm, approximately around 50 ppm of treatable contaminant.

Figure 7:
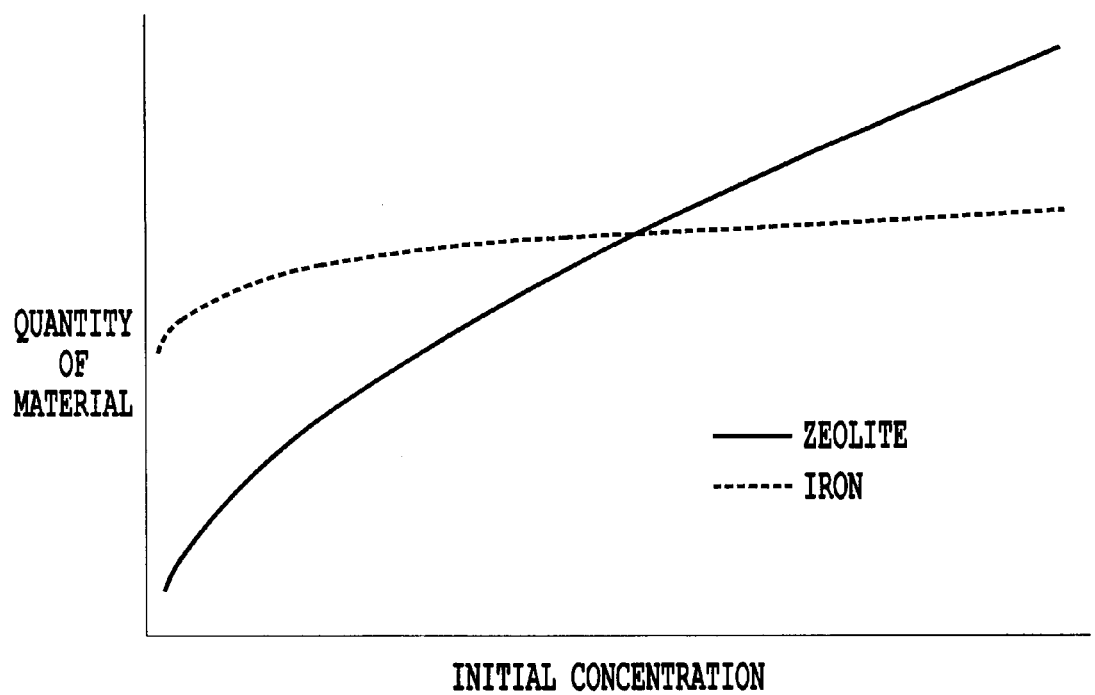
FIG. 7 shows a typical trend of how the quantity of material required for a metallic iron system and a zeolite system can vary with a variation in the concentration of the contaminants to be treated.

The graph shown in FIG. 7 shows a typical trend of how the quantity of material required for a metallic iron system and a zeolite system can vary with a variation in the concentration of the contaminants to be treated (Quantity of material-Zeolite Iron-Initial concentration).

In the present invention, analogously to what is frequently observed in the state of the art, the term zeolites will also include, for the sake of simplicity, those materials (for example microporous crystalline silicates and metallosilicates) which, although being characterized by a zeolitic lattice having a certain IZA code (for example MFI, MOR, FAU, BEA, etc.), should more appropriately be called microporous inorganic molecular sieves or microporous zeolite type materials. These materials should not, in fact, officially belong to the zeolite group, as they do not contain, for example, Al ions in the structure or contain hetero-elements not included in the definition (for example B, Ga, Fe, Ti, V, P, etc.).

The term zeolite, as used in the present patent, should therefore be considered in the broadest sense of the word. Both purely silica forms (for example S-1) and metallosilicates (for example TS-1) are, for example, therefore included in the definition.

The concepts specified above are well known in the state of the art (Molecular Sieves, Science and Technology, H. G. Karge—J. Weitkamp Editors, Vol. 1, 1998, Springer; Ch. Baerlocher, W. M. Meier and D. H. Olson, "Atlas of Zeolite Framework Types", 5$^{th}$ ed., Elsevier: Amsterdam, 2001. (http://zeolites.ethz.ch/IZA-SC/Atlas pdf/Complete Atlas Ed 5.pdf)).

The zeolites used in the process of the invention are zeolites characterized by channels with dimensions of 2.6 to 7.4 and an Si/Al ratio >200.

Zeolites of the ZSM-5, Mordenite, Y Zeolite and beta Zeolite are preferably used.

The zeolites are present in the reactive system in quantities determined by the concentration of the contaminant to be removed and quantified by their adsorption capacity, characteristic of the contaminant present and the type of zeolite used.

The zeolites which can be conveniently used in the process of the invention are those which were subjected to the formulation process.

This process envisages that microcrystals of the zeolites, having dimensions of 1-10 microns, be agglomerated in formulates with binders such as alumina ($Al_2O_3$), silica and clay to obtain particle sizes (0.2-4 mm) capable of ensuring the high permeability degree necessary for the functioning of the PRB.

The binders normally represent 20-60% by weight of the zeolites used.

The iron-zeolite system proved to be particularly suitable for the decontamination of water polluted by metals with a high oxidation degree, halogenated solvents, aromatic hydrocarbons, aromatic chloro-derivatives.

The process according to the invention is particularly effective in removing pollutants consisting of 1,2-dichloroethane, monochlorobenzene, dichlorobenzene, trichlorobenzene, tetrachlorobenzene, hexachlorobenzene, tetrachloroethylene, trichloroethylene, 1,2-dichloroethylene, vinyl chloride, Benzene, Toluene, ethyl-benzene, o,m,p-Xylenes, naphthalenes or mixtures thereof.

The process according to the invention also allows ions of heavy metals such as arsenic, chromium, to be effectively removed from water.

The system consisting of iron and ZSM-5 zeolite has proved to be particularly effective in the removal of organic contaminants.

Due to an unexpected synergic effect, the system of the present invention allows contaminants to be treated up to the limits of the law at concentrations ranging from 20 ppb to 500 ppm, with a high overall treatment capacity, based on the bifunctionality of the system and on the functioning synergy.

The process according to the invention can be conveniently used for the decontamination of groundwater by the use of permeable reactive barriers (PRB). In this case, the iron-zeolite system placed in succession forms the active medium of the barrier, situated in situ perpendicular to the groundwater flow, whose crossing on the part of the polluted stream allows decontamination by reduction and immobilization of the contaminating species.

EXAMPLES

The first part of the examples demonstrates the possibility of treating, with suitable zeolites, compounds not reducible with metallic iron and which cannot therefore be treated in decontamination processes with a metallic iron barrier.

The results obtained with 1,2 Dca, monochlorobenzene, 1,2,3-chlorobenzene, 1,2,4-chlorobenzene and hexachlorobenzene which are the most important non-treatable products in iron barriers, are presented in the order.

The isotherms were determined with batch tests.

A test-tube equipped with a Teflon stopper containing 20 ml of a solution of contaminant in water at a suitable concentration, was used for the tests. A quantity of zeolite ranging from 5 to 10 mg was added to the solution in the various tests.

The mixture was stirred in an apparatus having a rotating movement at about 30 rpm for 1 hour, subsequently determining the contents of contaminant in the solution to evaluate its adsorption.

Materials and Methods

Description of the Methods Used for Measuring the Properties of Active Materials General Procedure The materials, in a quantity of 10 mg, unless otherwise specified, are incubated in 20 ml of water in a tube with a Teflon stopper closed with metal rings with a minimum head space to allow stirring; the contaminating compound (up to 100 µl of an aqueous solution at a suitable concentration) is added with a 100 µl syringe; the stirring is effected in a complete rotation system (turbulator for powder mixing). At the end of the reaction, after 24 hours, and therefore at times definitely higher than the equilibrium times determined for each adsorbent, the mixture is centrifuged for 15' at 700 rpm to separate the adsorbing material and the non-adsorbed contaminant is determined from its residual concentration in solution. Each determination is effected at least three times. For each determination the sample and control consisting of liquid and contaminant without an adsorbent are prepared under the same conditions. This procedure was followed for all the contaminants examined.

Determination of the Equilibrium Times

From 10 mg to 1 g of adsorbing material are left to incubate with 20 ml of water containing from 100 ppb to 5 ppm of contaminant under stirring at room temperature for times varying from 15' to 48 h. The equilibrium time is considered as being the one above which the adsorption has not increased. In studying the effects of the conditions on the adsorption, the quantity of adsorbent was used, which determines the adsorption of at least half of the contaminant put in contact.

Column Tests

Adsorption tests with synthetic water containing mixtures of contaminants or with real groundwater were carried out in columns.

The columns were prepared to have a column diameter/adsorbent particle diameter >50, a value which is necessary for guaranteeing the absence of preferential channels or wall effects during the treatment. The columns (having dimensions of 2.5×20 cm or 7.5×40 cm depending on the diameter of the particles) are also equipped with sampling points (mininert) to follow the saturation along the column. The filling of the columns is effected with suitable quantities of zeolites.

The water containing the contaminants, inserted in a deforming tedlar-bag to ensure the homogeneity of the solution with time, is pumped into the column in up-flow, at suitable flow-rates, with a peristaltic pump. The eluate is collected in a fraction collector in tubes equipped with a Teflon stopper for immediate gas-chromatographic analysis. The performances are determined by the Breakthrough curve showing the eluted volume or time in the abscissa and the relative concentration (eluted concentration/initial concentration: $C/C_0$) in the ordinate.

Analysis of TCE, DCA, DCE, VC, TOLUENE, (Solution)

The aqueous solution is extracted with hexane in a ratio of 5.666/1 ($H_2O$/hexane), in a tube analogous to the reaction tube; a milliliter of hexane is removed for GC-ECD or GC-FID analysis. The control consists of the sample, without the adsorbent, subjected to the same treatment.

GC/MS Analysis of TOLUENE/TCE, DCE, DCA, VC in a Mixture

The analysis is effected from suitable aqueous solutions by measuring the contaminants in the head space. The system used was GC/MS/DS Mod. MAT/90 of Finnigan; the gas-chromatographic column used was a PONA (length 50 m×0.21 mm I.D. and 0.5 µm of film) of Hewlett-Packard. The flow-rate of the carrier measured at 35° C. proved to be 0.6 ml/min (Helium). 500 µl of each sample were injected of the head space by removal, with a gas syringe (heated), from the phial kept at equilibrium for 2 h at 70° C. The mass spectrometer operated in E.I. (electronic impact) at 70 eV and at a resolution of 1500 in the mass range of 30-120 a.m.u. and at a scanning rate which was such as to acquire a spectrum every 0.8 s.

Example 1

The adsorption isotherm of 1,2-dichloroethane on ZSM-5 was obtained with adsorption experiments with initial concentrations within the range of 50 ppb-200 ppm.
The results obtained are indicated in FIG. 1.

Example 2

Figure 2:
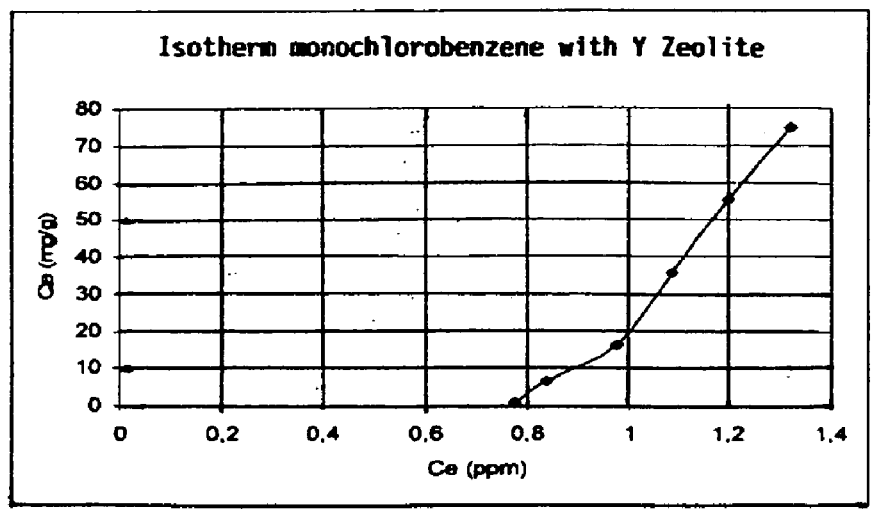
FIG. 2 shows the results obtained in Example 2.

The adsorption isotherm of monochlorobenzene with Y zeolite was obtained with adsorption experiments with initial concentrations within the range of 1000 ppb-20000 ppb.
The results obtained are indicated in FIG. 2.

Example 3

Figure 3:
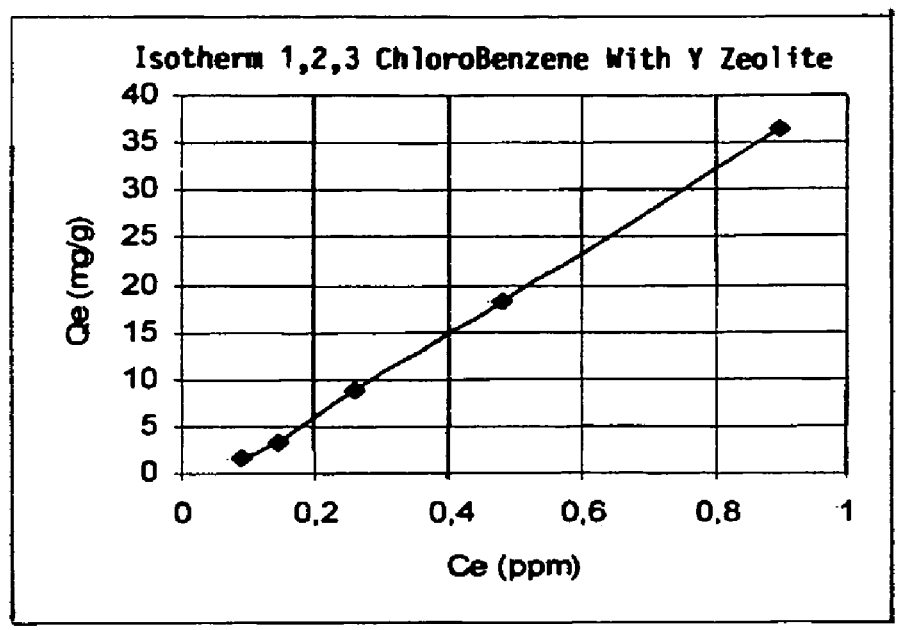
FIG. 3 shows the results obtained in Example 3.

The adsorption isotherm of 1,2,3-chlorobenzene with Y zeolite was obtained with adsorption experiments with initial concentrations within the range of 500 ppb-10000 ppb.
The results obtained are indicated in FIG. 3.

Example 4

Figure 4:
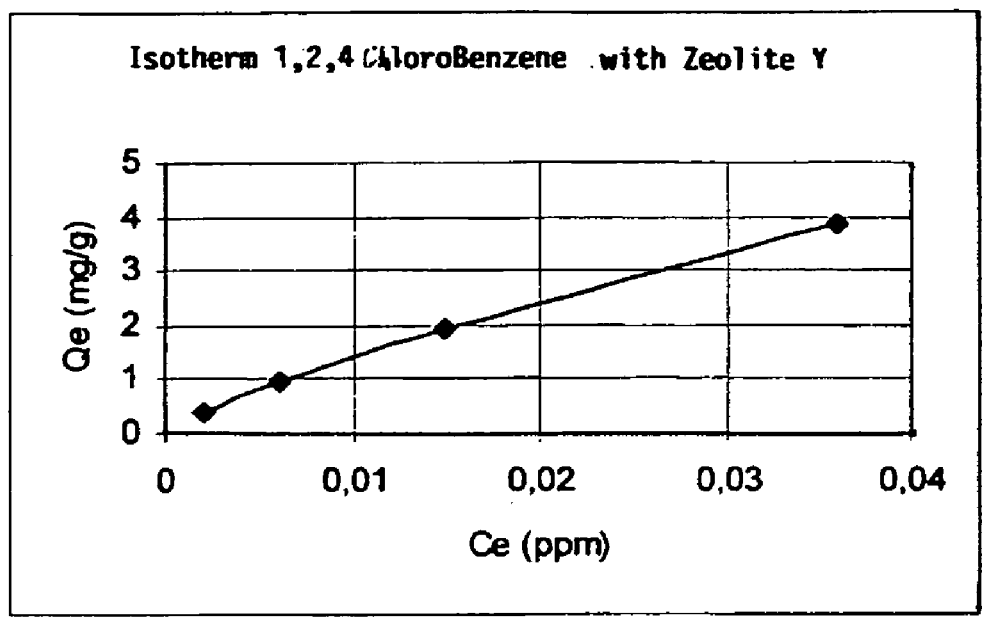
FIG. 4 shows the results obtained in Example 4.

The adsorption isotherm of 1,2,4-chlorobenzene with Y zeolite was obtained with adsorption experiments with initial concentrations within the range of 100 ppb-1000 ppb.
The results obtained are indicated in FIG. 4.

Example 5

Figure 5:
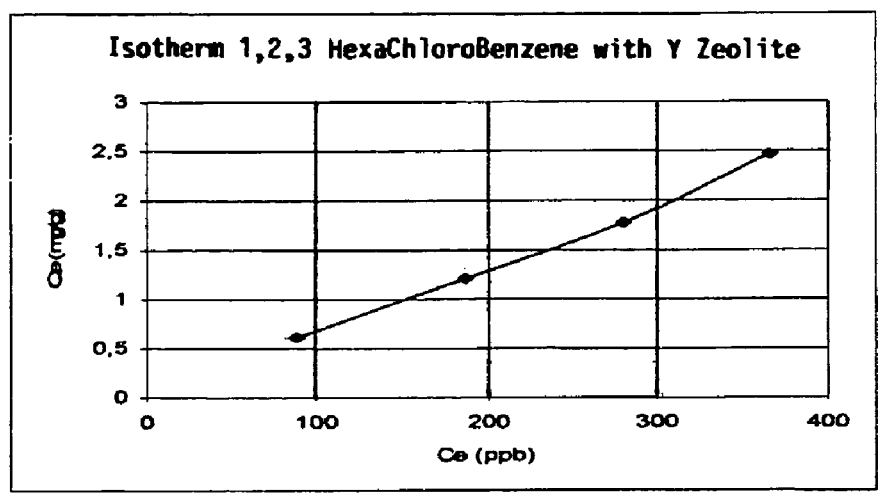
FIG. 5 shows the results obtained in Example 5.

The adsorption isotherm of hexachlorobenzene with Y zeolite was obtained with adsorption experiments with initial concentrations within the range of 100 ppb-1000 ppb.
The results obtained are indicated in FIG. 5.

Example 6

Figure 6:
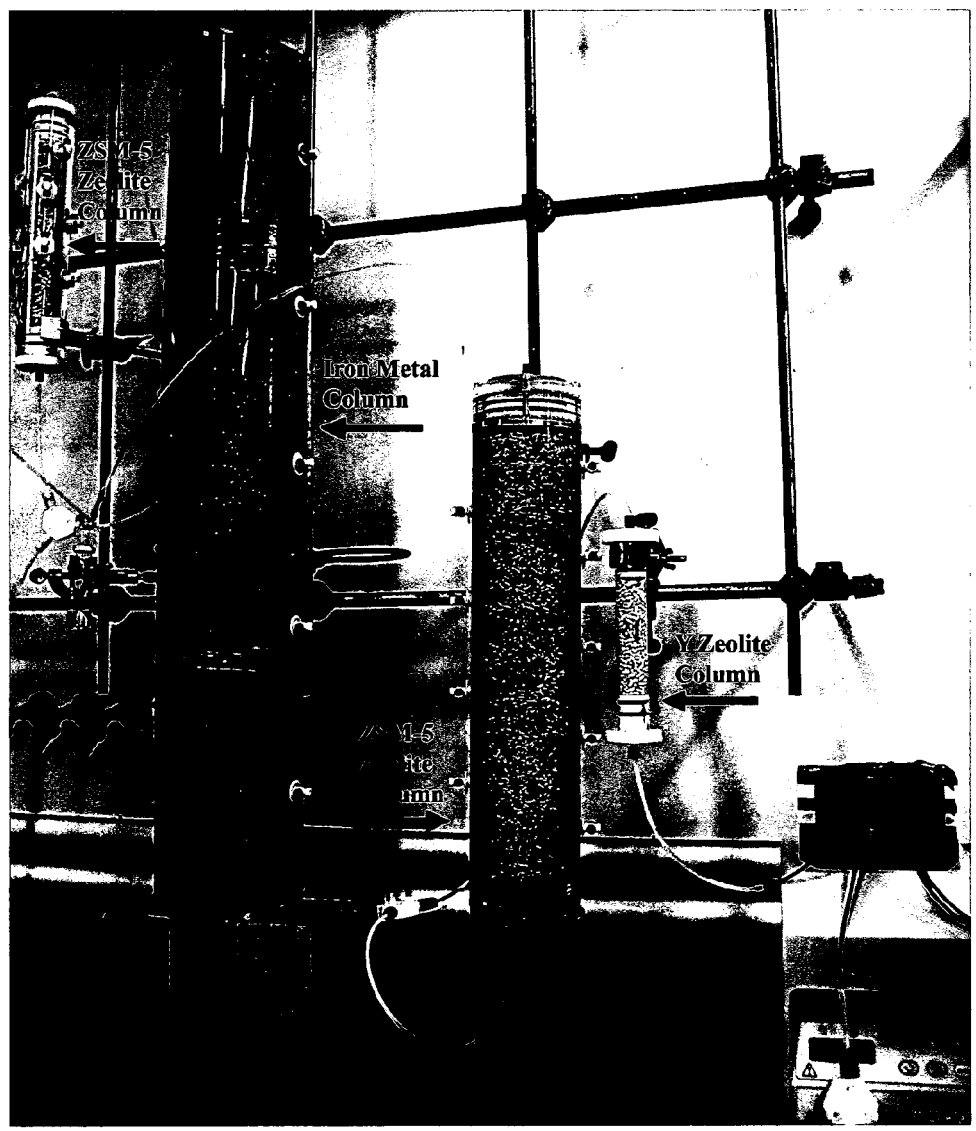
FIG. 6 shows a simulation apparatus.

Use in a Simulation Apparatus (FIG. 6)
System of two zeolites in succession: a column of Y Zeolite, for high concentration Toluene, followed by a ZSM-5 column, specific for 1,2-DCA and capable of removing TCE.
Fe/Zeolite system: a metallic iron column followed by a ZSM-5 column.

Mixture of Contaminants Consisting of:
an aromatic compound: Toluene 40 ppm
a compound non-reducible with iron: 1,2 DCA 35 ppm
an alkene-chlorinated compound, TCE, at a high concentration: TCE 367 ppm.

Experimental Conditions:
CONTAMINANT: TCE 367 ppm; DCA 35 ppm; Toluene 40 ppm.

Two zeolite system in succession:
Zeolite Y column: 25×100 mm (21 g zeolite);
ZSM-5 column: 75×400 mm (250 g zeolite)

Iron-Zeolite System in Succession:
$Fe^0$ column: 125×800 mm (40 kg $Fe^0$) (T contact 1 month)
ZSM-5 column: 25×200 mm (37 g zeolite)

The results are shown in Table 1 and indicate that the iron succeeds in degrading TCE but is ineffective with DCA and Toluene which is effectively removed with ZSM-5.

The data also demonstrate that if only zeolites are used (zeolite Y and subsequently ZSM-5) saturation is reached with 25 l of contaminants; with metallic Iron followed by ZSM-5 after 25 liters, the system is still effective. In the case of zeolite Y and ZSM-5, 271 g of zeolites were used, in the case of Iron/ZSM-5 37 g of zeolites were used.

TABLE 1

| | Column Z. Y (21 g) | | | Column ZSM-5 (250 g) | | | Column $Fe^0$ (40 Kg) | | | Column ZSM-5 (37 g) | | |
|---|---|---|---|---|---|---|---|---|---|---|---|---|
| Volume Eluted (L) | DCA | TCE (ppm) | Tol | DCA | TCE (ppm) | Tol | DCA | TCE (ppm) | Tol | DCA | TCE (ppm) | Tol |
| 0 | 35 | 367 | 40 | 35 | 367 | 40 | 35 | 367 | 40 | 35 | 367 | 40 |
| 3 | 35 | 367 | 5 | <0.01 | <0.01 | <0.01 | 35 | 0.050 | 40 | <0.01 | <0.01 | <0.01 |
| 6 | 35 | 367 | 8 | <0.01 | <0.01 | <0.01 | 35 | 0.050 | 40 | <0.01 | <0.01 | <0.01 |
| 9 | 35 | 367 | 39 | <0.01 | <0.01 | <0.01 | 35 | 0.050 | 40 | <0.01 | <0.01 | <0.01 |
| 18 | 35 | 367 | 40 | <0.01 | <0.01 | <0.01 | 35 | 0.050 | 40 | <0.01 | <0.01 | <0.01 |
| 25 (11 g) | 35 | 367 | 40 | <0.01 | <0.01 | <0.01 | 35 | 0.050 | 40 | 0.6 | 8.7 | 5.6 |
| Half column | | | | 15 | 180 | 25 | | | | 8 | 91 | 13 |

Example 7

System as in Example 6 with half of the quantity of iron.
Fe⁰ column: 125×400 mm (20 kg Fe⁰) (T contact 0.5 month)
ZSM-5 column: 25×200 mm (37 g zeolite)
The results are indicated in Table 2.

TABLE 2

| Volume eluted (L) | Column Fe⁰ (20 Kg) | | | | Column ZSM-5 (37 g) | | | |
|---|---|---|---|---|---|---|---|---|
| | DCA | TCE | DCE | Tol | DCA | TCE | DCE | Tol |
| | (ppm) | | | | (ppm) | | | |
| 0 | 35 | 367 | 0 | 40 | 35 | 367 | 0 | 40 |
| 3 | 35 | 270 | 98 | 40 | <0.01 | <0.01 | <0.01 | <0.01 |
| 6 | 35 | 219 | 147 | 40 | <0.01 | <0.01 | <0.01 | <0.01 |
| 9 | 35 | 200 | 165 | 40 | <0.01 | <0.01 | <0.01 | <0.01 |
| 18 | 35 | 190 | 170 | 40 | <0.01 | <0.01 | 0.01 | <0.01 |
| 25 (11 g) | 35 | 170 | 190 | 40 | 0.6 | 5.9 | 6.7 | 5.6 |
| Half column | | | | | 8 | 68 | 87 | 13 |

With the metallic Iron system, having half dimensions with respect to Example 6, followed by ZSM-5, after 25 liters, the system is still effective. In the case of Iron/ZSM-5, the zeolites used were 37 g, and the iron used was 20 Kg. The effect on the zeolites of the intermediate products, generated in the reduction reaction with metallic iron due to the half quantity of iron and therefore half of the contact time, only slightly increase the saturation degree of the zeolite.

The invention claimed is:

1. A process for treating water contaminated by a contaminant selected from the group consisting of a metal with a high oxidation degree, an aliphatic compound, an aromatic compound, a halogen-aromatic compound, a chlorinated alkane, a chlorinated alkene and mixtures thereof; the process comprising
    circulating the contaminated water through metallic iron and a zeolite having a silica/alumina ratio >50, situated in succession, wherein the water passes through the metallic iron first.

2. The process according to claim 1,
    wherein the contaminated water is contaminated groundwater,
    wherein contaminated ground water flows through a permeable reactive barrier (PRB), situated in situ perpendicular to the groundwater flow,
    wherein the PRB comprises the iron and the zeolite, in succession, as a reactive system,
    and
    wherein, when the contaminated ground water enters the reactive system of the PRB, the water flows first through the iron, then through the zeolite.

3. The process according to claim 1, wherein the zeolite comprises channels having dimensions ranging from 2.6 to 7.4 Å and has a Si/Al ratio of >200.

4. The process according to claim 3, wherein the zeolite is selected from the group consisting of ZSM-5 zeolite, Mordenite, Zeolite Y and Zeolite beta.

5. The process according to claim 1, wherein the zeolite is in the form of a formulate that comprises a binder selected from the group consisting of alumina, silica, clay and combinations thereof.

6. The process according to claim 5, wherein the formulate comprises from 40% to 60% by weight of the binder, based on the total weight of the formulate.

7. The process according to claim 1, wherein the contaminated water is contaminated by a compound selected from the group consisting of 1,2-dichloroethane, monochlorobenzene, dichlorobenzene, trichlorobenzene, tetrachlorobenzene, hexachlorobenzene, tetrachloroethylene, trichloroethylene, 1,2-dichloroethylene, vinyl chloride, benzene, toluene, ethylbenzene, para-xylene, meta-xylene, ortho-xylene, a naphthalene, and mixtures thereof.

8. The process according to claim 1, wherein the contaminated water comprises the metal with a high oxidation degree, and wherein the metal comprises arsenic ions, chromium ions, or combinations thereof.

9. The process according to claim 1, wherein the zeolite is a ZSM-5 zeolite.

10. The process of claim 1, wherein the metallic iron and the zeolite act synergistically.

11. The process of claim 2, wherein the zeolite comprises channels having dimensions ranging from 2.6 to 7.4 Å and has a Si/Al ratio of >200.

12. The process of claim 5, wherein the formulate is in the form of particles, and wherein the particles have a particle size range of from 0.2 mm to 4 mm.

13. The process of claim 1, wherein the concentration of the contaminant in the contaminated water ranges from 20 ppb to 50 ppm.

14. The process of claim 8, wherein the metal comprises the arsenic ions.

15. The process of claim 8, wherein the metal comprises the chromium ions.

16. The process of claim 8, wherein the metal comprises the arsenic ions and the chromium ions.

17. The process of claim 1, wherein the contaminated water does not comprise arsenic ions.

18. The process of claim 1, wherein the amount of the metallic iron is less than the amount of the zeolite, on a weight to weight basis.

19. The process of claim 1, wherein the amount of the metallic iron is more than the amount of the zeolite, on a weight to weight basis.

20. The process of claim 1, wherein the concentration of the contaminant in the contaminated water is 50 ppm.

* * * * *